United States Patent [19]

Billiet et al.

[11] Patent Number: 4,696,687
[45] Date of Patent: Sep. 29, 1987

[54] FILTERS

[75] Inventors: Colin T. Billiet, Durham; David Baggett, Newcastle upon Tyne; Robert M. Fielding, Blyth, all of England

[73] Assignee: Domnick Hunter Filters Limited, Durham, England

[21] Appl. No.: 873,398

[22] Filed: Jun. 12, 1986

[30] Foreign Application Priority Data

Jun. 13, 1985 [GB] United Kingdom ............... 8515047

[51] Int. Cl.$^4$ ............................................. B01D 53/02
[52] U.S. Cl. ....................................... 55/316; 55/274; 55/312; 55/387
[58] Field of Search ........................... 55/274, 310-312, 55/316, 387; 210/232, 238

[56] References Cited

U.S. PATENT DOCUMENTS

| 2,593,132 | 4/1952 | Gannon | 55/387 |
| 2,718,310 | 9/1955 | Trahan | 210/232 X |
| 2,728,407 | 12/1955 | Squier | 55/516 X |
| 2,845,138 | 7/1958 | Gageby | 55/387 |
| 3,360,128 | 12/1967 | Federline | 210/232 X |
| 3,841,484 | 10/1974 | Domnick | 55/274 X |
| 3,891,417 | 6/1975 | Wade | 55/316 X |
| 3,963,891 | 6/1976 | de Magondeaux | 55/274 X |
| 4,063,913 | 12/1977 | Kippel et al. | 55/274 |
| 4,121,916 | 10/1978 | Fricke | 55/316 |
| 4,234,014 | 11/1980 | Knight | 55/274 X |
| 4,236,902 | 12/1980 | Fricke | 55/316 X |
| 4,256,474 | 3/1981 | Berger, Jr. et al. | 55/316 X |
| 4,594,082 | 6/1986 | Catherwood, Sr. | 55/316 |

Primary Examiner—Robert Spitzer
Attorney, Agent, or Firm—Henry Sternberg; Bert J. Lewen

[57] ABSTRACT

A filter pack comprises a first housing member (1) having an inlet port and an outlet port (4) for compressed air; the outlet port being connectable to a piece of equipment, for example a spray gun. A second housing member (6) is removably fitted into the first housing member through an opening (5) therein and has a section (8) protruding from the opening. A retaining ring (12) releasably secures the two housing members together. The second housing member is at least partially filled with activated carbon filter material (18). A wall area (19) of the second housing member is formed with an inlet into the interior thereof, and the wall area combines with part of the first housing member to form a chamber (15) in communication with the inlet and outlet ports. The protruding section (8) of the second housing member has an outlet (9) for connection to an airline, the flow path from the inlet port to the outlet of the second housing member being through the chamber and then through the filter material. The outlet may be connected to a breathing mask by way of a regulator assembly (23).

9 Claims, 4 Drawing Figures

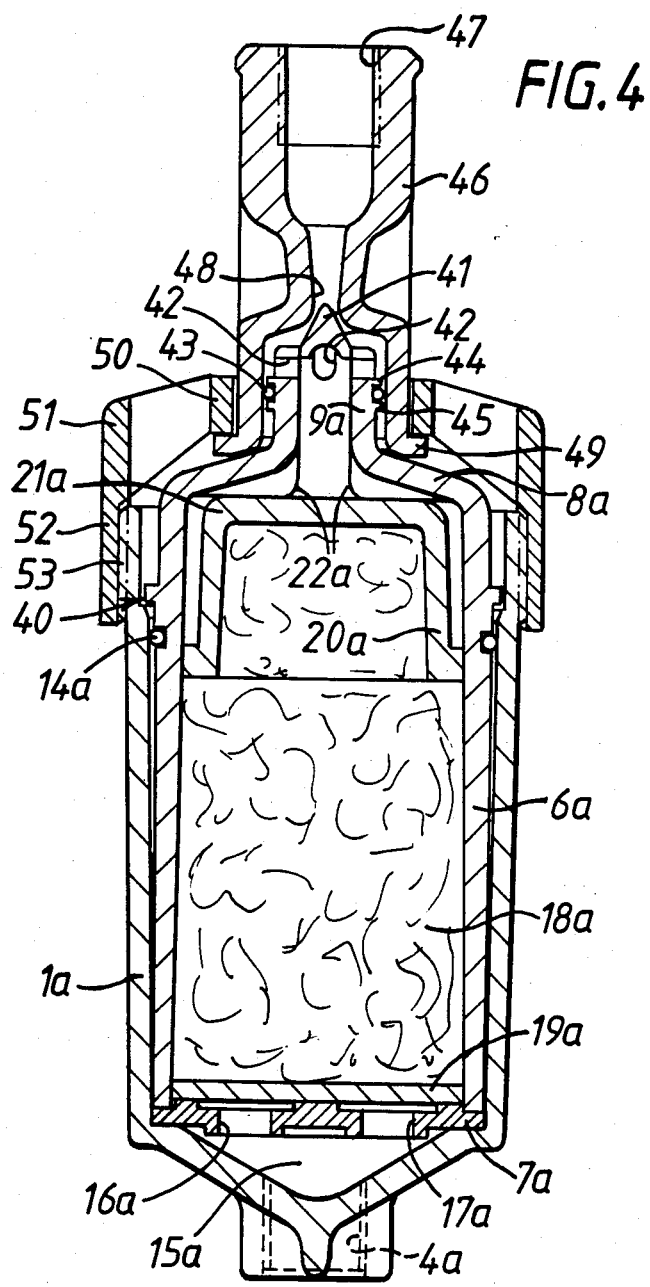

FILTERS

This invention relates to filter packs.

It is particularly concerned with a filter pack for producing air suitable for breathing from a supply of compressed air, which supply is also required to operate a further piece of equipment. For example, when using spray guns in confined environments it is common for a single compressed air supply to provide both the air for the spray gun, and air supplied to a face mask worn by the operator. The compressed air supply is commonly led to an inlet into a chamber of a filter pack, the chamber also having an outlet which can be connected directly to a spray gun or other apparatus. Part of the supply thus passes directly through the chamber, but a further part is taken through the filter pack, usually containing activated carbon granules, to a second outlet which can be connected to a breathing mask. Commonly, the whole of this filter pack has been made as a disposable item so that when the filter material is no longer effective the pack is merely discarded. This requires disconnection of the pipe leading from the compressed air supply, the pipe leading to the spray gun or other apparatus and the pipe leading to the breathing mask. If, as is usually required, the pack is of portable construction that may be attached to the clothing then it must be removed from the clothing to be discarded. The new pack is then attached to the clothing and the pipework connections are made so that work may continue. Time is lost in this process, and discarding the whole of the pack is not particularly cost-effective.

In alternative systems a replaceable filter cartridge may be fully enclosed within a housing to which the necessary pipework connections are made. Replacement in this instance again requires removal of at least some of the connections, opening of the housing to remove the used cartridge, replacement of the cartridge and reconnection of the pipework. Again, delay is involved, and the known systems are bulky and heavy, so impeding the operator in his duties.

The object of the present invention is to provide a filter pack wherein the filter material may be more readily replaced than in the packs already known, and that can be made more compact and lighter in weight than existing packs. This is particularly significant when the pack is designed for attachment to an operator's clothing.

According to the invention a filter pack comprises a first housing member having an inlet port and an outlet port for compressed air; a second housing member removably fitted into the first housing member through an opening therein and having a section protruding from or accessible through the opening; and means for releasably securing the two housing members together; in which the second housing member is at least partially filled with activated carbon filter material, a wall area of the second housing member is formed with an inlet into the interior thereof, the wall area combining with part of the first housing member to form a chamber in communication with the inlet and outlet ports, and the protruding section of the second housing member has an outlet for connection to an airline, the flow path from the inlet port to the outlet of the second housing member being through the chamber and then through the filter material.

In such a pack the second housing member together with its contents is designed to be disposable. All that is needed to change the filter material contained therein is (in some cases only) to disconnect a line from the outlet from the second housing member to a breathing mask and to remove the second housing member from the first housing member after releasing the securing means. A fresh second housing member may then be inserted into the first housing member, the securing means fastened and the line to the breathing mask again connected. It will be seen that there is no need whatsoever to remove the first housing member from the wearer's clothing or other convenient location, nor is there any need to disconnect the hoses from the compressed air supply and to the spray gun or other equipment. Indeed, in the preferred embodiments, there is no need to disconnect the hose to the breathing mask. A more rapid change is thus obtained, and cost savings may also be obtained as the disposable elements are simple and may be manufactured cheaply.

Preferably, the first and second housing members are hollow cylindrical members; the first housing member has the inlet and outlet ports at a first end thereof, and has an open second end through which the second housing member fits; the inlet into the interior of the second housing member is through a first end wall thereof lying adjacent to the first end of the first housing member; and the second housing member has a second end wall protruding from the opening and formed with the outlet from the second housing member.

This is a particularly convenient configuration for the filter pack, although it will be appreciated that it is not essential and that housing members of other than cylindrical shape can be used. Similarly there is no need for the inlet and outlet ports to be located at an end opposite to the outlet from the second housing member, and these may be in any convenient relative locations on the pack. Desirably, they are arranged one close to the other and both in direct communication with the chamber.

Efficiency is, of course, improved if air is prevented from leaking from the opening in the first housing member, and this may conveniently be done by providing sealing means between an outer surface of the second housing member and an inner surface of the first housing member.

The releasable locking means may be of any convenient form, for example a locking ring or a bayonet type fitting.

It is preferred that filter elements are located within the second housing member between the inlet thereinto and the activated carbon filter material, and between the activated carbon filter material and the outlet from the second housing member. These additional filter elements will prevent activated carbon leaking from the second housing member, and particularly prevent carbon dust and other small particles from being carried over into the supply taken from the second housing member outlet. For specific uses, filter material other than activated carbon may also be incorporated in the second housing member. The outlet from the second housing member may have a regulating assembly associated therewith in order to regulate the flow of air therefrom, for example in the form of a simple needle valve, or in the form of a pressure regulator. Alternatively the outlet may simply be designed for connection to an air hose connected to a breathing mask that has its own integral flow of pressure regulation system, e.g. a demand valve.

In order that the invention may be better understood specific embodiments of filter packs in accordance therewith will now be described in more detail, by way of example only, with reference to the accompanying drawings in which:

FIG. 3 is a part elevation part sectional view of a second embodiment of pack and FIG. 4 is a section taken on the line IV—IV of FIG. 3.

Figure 1:
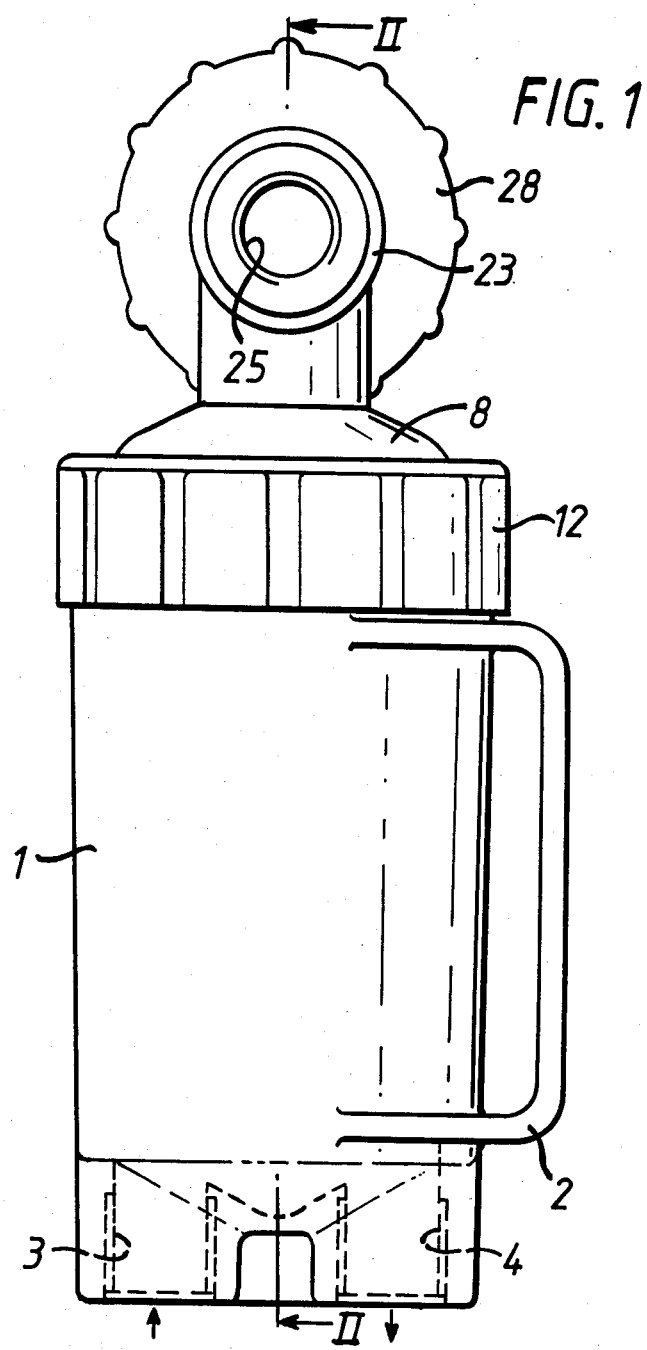
FIG. 1 is an elevation of a first embodiment of pack.
Figure 2:
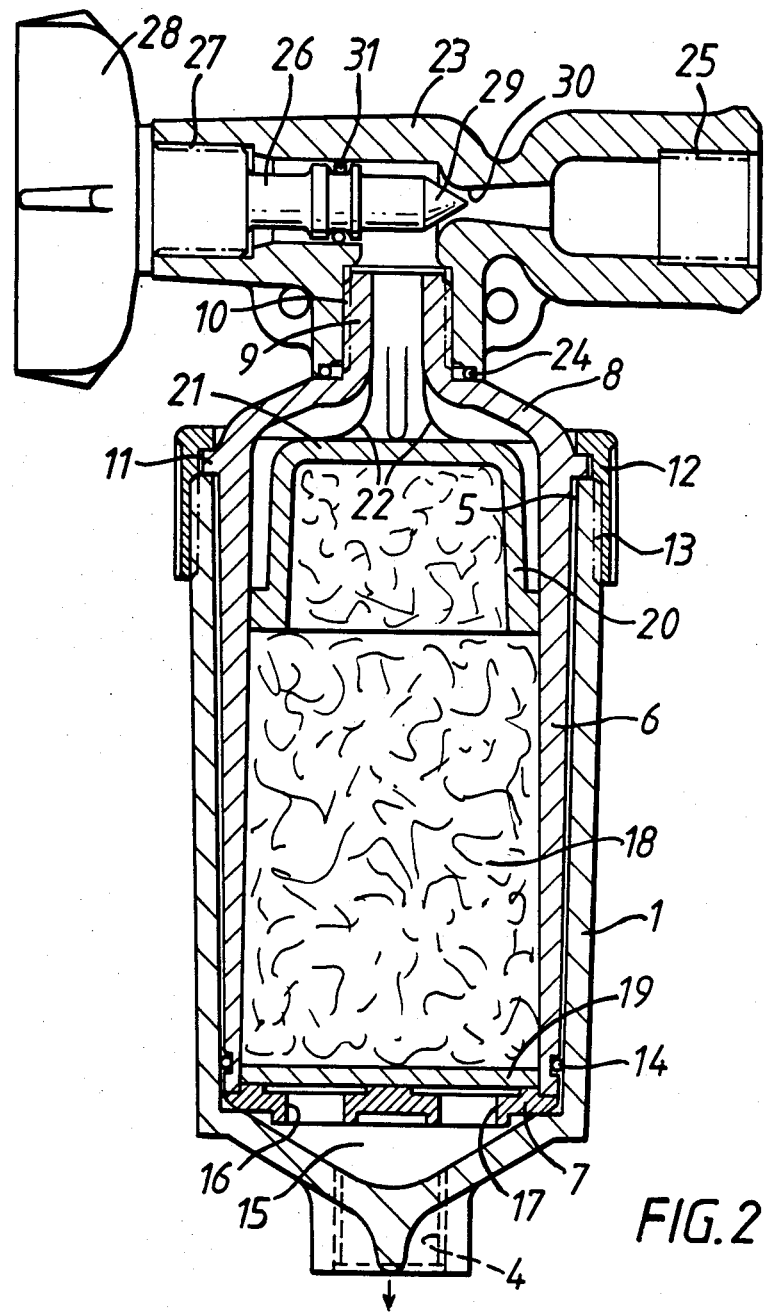
FIG. 2 is a cross-section taken on the line II—II of FIG. 1.

Referring first to FIGS. 1 and 2 there is shown a filter pack comprising a first housing member 1 formed with a handle, mounting bracket or other attachment means 2 by way of which it may be fixed to the belt or other part of the clothing of a user. Internally threaded inlet and outlet ports 3, 4 for compressed air are provided at a first end of the first housing member, and the member has a second, open end 5. A second housing member 6 is removably fitted into the first housing member through the opening 5, the second housing member having a first end wall 7 and a second end wall 8 that protrudes from the opening 5 and that is formed with an outlet 9 provided with an external screw thread 10. Both the first and second housing members are of hollow circular-cylindrical form.

The second housing member has an external shoulder 11 which seats on the end of the first housing member, and a locking ring 12 is engageable with the shoulder 11 and is screwed onto a thread 13 formed externally on the upper part of the first housing member in order to secure the housing members together. A sealing ring 14 is located between the two housing members.

The first end wall 7 combines with part of the first housing member to form a chamber 15 that is in direct communication with the inlet and outlet ports 3 and 4. The wall 7 is formed with openings 16 and 17 that communicate the chamber 15 with the interior of the second housing member. This member is filled with activated carbon filter material 18 held between a microporous filter plate 19 adjacent to the first end wall 7 and a microporous filter cup 20 adjacent to the second end wall 8. In accordance with known practice, granules of an oil-soluble dye may be incorporated in the region of the cup 20, to give a colour indication on exhaustion of the filter material. The upper wall 21 of the cup seats against circumferentially spaced ribs 22 moulded within the second housing member in order to locate the cup positively within that member, while allowing unrestricted flow of air from the cup to the outlet 9.

A regulating assembly for controlling air flow is associated with the outlet 9, the assembly having a body 23 with a threaded opening by way of which the body may be releasably screwed onto the threads 10 of the outlet 9. A sealing ring 24 prevents air leakage past the threads. One end of the body 23 is provided with an internally threaded connector 25 for an air hose to a breathing mask. A needle valve 26 is mounted in the other end of the body by a screw threaded connection 27, the valve being controllable by a hand wheel 28. Rotation of the hand wheel will cause axial movement of a needle 29 within a throat 30, so controlling passage of air through that throat. Leakage past the valve in the opposite direction is prevented by a sealing ring 31.

Operation of the pack will be apparent from the drawings. Air from a compressed air supply enters the chamber 15 through the inlet port 3, and leaves the chamber through the outlet port 4, which is connected by a hose to a spray gun or other piece of equipment. Part of the air flows through the openings 16 and 17 and passes through the filter plate 19, the activated carbon 18 and the filter cup 20, so that filtered air leaves through the outlet 9, the amount of air passing to the port 25 being regulated by the position of the needle valve. The action of the activated carbon and the presence of the filters 19 and 20 ensures that the air provided at the port 25 is suitable for breathing purposes.

Once the activated carbon has been exhausted, the filter is quite simply replaced by stopping the air supply, unscrewing the retaining ring 12 and lifting the second housing member out of the first housing member. The second housing member can then be unscrewed from the threaded opening of the needle valve body 23 and a replacement member screwed onto that body, placed into the first housing member and the retaining ring replaced. It will be seen that this operation can be carried out without the need to detach any of the hose connections to the first housing member or to the needle valve assembly, and without having to remove the housing member from the user's clothing.

Figure 3:
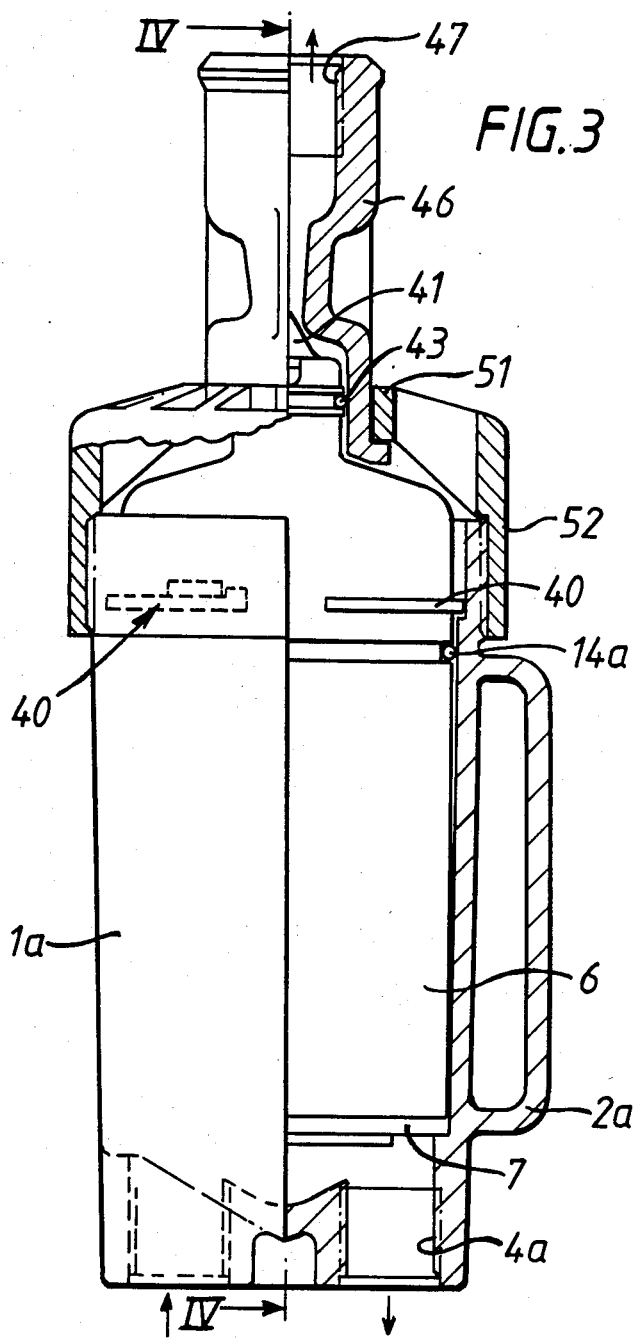

FIGS. 3 and 4 show a somewhat similar arrangement wherein identical parts are given the same reference numeral as used in FIGS. 1 and 2, with the suffix a.

This filter pack differs from that already described in that the first and second housing members are secured together by way of a bayonet connection 40, the sealing ring 14a being positioned between the two housings immediately below the bayonet connection. Additionally, the regulating assembly is different, and in this respect the outlet 9a from the second housing member 6a is formed with an integral needle 41 at the end thereof, the outlet also being formed with radial openings such as 42 through the wall thereof immediately below the needle 41. The outlet also carries a sealing ring 43 captive between enlarged flanges 44 and 45 on the external wall of the outlet. A connector 46 has an internally threaded connection 47 for a hose to a breathing mask, and has a throat 48 in cooperating relationship with the needle 41. The inner end of the connector has a shoulder 49 against which bears a part 50 of an adjusting ring 51 having an internally threaded skirt 52 engaged with screw threads 53 on the outer surface of the first housing member 1a. It will be seen that rotation of the ring 51 relative to the first housing member will cause axial movement of the ring, and thus axial movement of the connector 46 relative to the needle 41, so varying the restriction within the throat 48.

Operation of the pack shown in FIGS. 3 and 4 is similar to that shown in FIGS. 1 and 2, and the pack offers the same advantages of rapid disconnection between the first housing member and the second, disposable housing member and its contents, without the need for removing any of the air hoses.

Rather than regulate air flow at the outlet from the second housing member, it is possible, in alternative arrangements, to use a pressure regulator upstream of the filter element. Such regulator may be an integral part of the first housing member or may be detachably mounted thereon to control air flow at the inlet ports.

Modifications of the disclosed housing configurations and the particular arrangements of ports will be apparent to those skilled in the art.

We claim:

1. A filter pack for connection to a supply of compressed air in order to provide an unfiltered primary output supply of air from the pack and a filtered secondary output supply of air from the pack, the pack comprising a first housing member having an inlet port and a first outlet port, means for connecting said inlet port to a supply of compressed air, means for connecting said first outlet port to a primary output supply line; a second housing member removably fitted into said first housing member through an opening in said first housing member and having a section accessible through said opening; means for releasably securing the two housing members together; activated carbon filter material at least partially filling said second housing member and said second housing member having a wall portion thereof which is formed with an inlet into the interior thereof, said wall portion combining with part of said first housing member to form a chamber in communication with said inlet port and with said first outlet port; said accessible section of said second housing member comprising a second outlet port adapted to be connected to a secondary output supply air line, whereby the pack defines a first flow path directly from said inlet port through said chamber to said first outlet port for discharge of unfiltered air from the pack, and a second flow path from said inlet port through said chamber and through said filter material to said second outlet port for discharge of filtered air from the pack.

2. A filter pack according to claim 1 in which the first and second housing members are hollow cylindrical members; the first housing member has the inlet and outlet ports at a first end thereof, and has an open second end through which the second housing member fits; the inlet into the interior of the second housing member is through a first end wall thereof lying adjacent to the first end of the first housing member; and the second housing member has a second end wall protruding from the opening and formed with the outlet from the second housing member.

3. A filter pack according to claim 1 in which sealing means are provided between an outer surface of the second housing member and an inner surface of the first housing member to prevent leakage of air from the opening in the first housing member.

4. A filter pack according to claim 1 in which the releasable securing means comprises a locking ring engageable with a shoulder on the second housing member and screwed onto a thread formed on the first housing member.

5. A filter pack according to claim 1 in which the releasable securing means comprises a bayonet-type fitting between the first and second housing members.

6. A filter pack according to claim 1 in which filter elements are located within the second housing member between the inlet thereto and the activated carbon filter material, and between the activated carbon filter material and the outlet from the second housing member.

7. A filter pack according to claim 1 in which a regulating assembly is associated with the outlet from the second housing member to regulate flow of air therefrom.

8. A filter pack according to claim 7 in which the regulating assembly is releasably secured to the second housing member.

9. A filter pack according to claim 1 in which the first housing member has means whereby it may be attached to the clothing of a user.

* * * * *